United States Patent [19]
Fortescue

[11] 4,429,307
[45] Jan. 31, 1984

[54] CAPACITIVE TRANSDUCER WITH CONTINUOUS SINUSOIDAL OUTPUT

[75] Inventor: Stephen M. Fortescue, Canoga Park, Calif.

[73] Assignee: Dataproducts Corporation, Woodland Hills, Calif.

[21] Appl. No.: 343,726

[22] Filed: Jan. 29, 1982

[51] Int. Cl.³ .......................................... G08C 19/10
[52] U.S. Cl. ............................ 340/870.37; 324/61 R; 340/347 P
[58] Field of Search ...................... 340/870.37, 870.32, 340/347 P; 318/662; 324/61 R

[56] References Cited

U.S. PATENT DOCUMENTS

| | | | |
|---|---|---|---|
| 3,068,457 | 12/1962 | Nevius | 340/870.37 |
| 3,125,716 | 3/1964 | Machlis | 340/870.37 |
| 3,219,920 | 11/1965 | Wall | 340/870.37 |
| 3,312,892 | 1/1975 | Parnes | 323/93 |
| 3,702,467 | 11/1972 | Melnyk | 340/870.37 |
| 3,784,897 | 1/1974 | Norrie | 340/870.37 |
| 3,860,918 | 1/1975 | Cencel | 340/870.37 |
| 3,938,113 | 2/1976 | Dobson et al. | 340/870.37 |
| 3,961,318 | 6/1976 | Farrand et al. | 340/870.37 |
| 4,092,579 | 5/1978 | Weit | 318/662 |

*Primary Examiner*—James J. Groody
*Attorney, Agent, or Firm*—Spensley, Horn, Jubas & Lubitz

[57] ABSTRACT

A capacitive encoder utilizing a stationary plate having transmitter elements and receiver elements located on the surface thereof and a moving plate having two conductive areas separated by a sine wave shaped gap. The receiver elements on the stationary plate overlie the gap and provide outputs which vary as a function of the position of the gap with respect to the output elements. Signals from the output elements are differentially amplified and demodulated in order to provide precise sine and cosine outputs, the accuracy of which are unaffected by variations in the input signal.

10 Claims, 8 Drawing Figures

FIG. 3
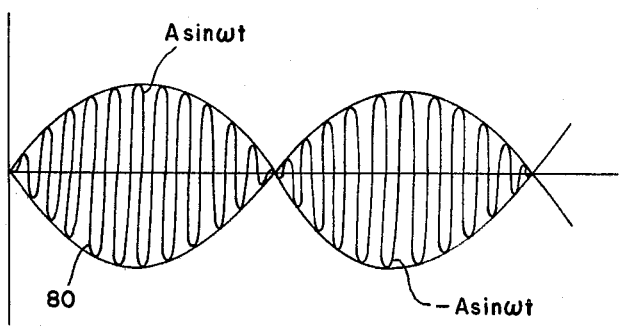
FIG. 4
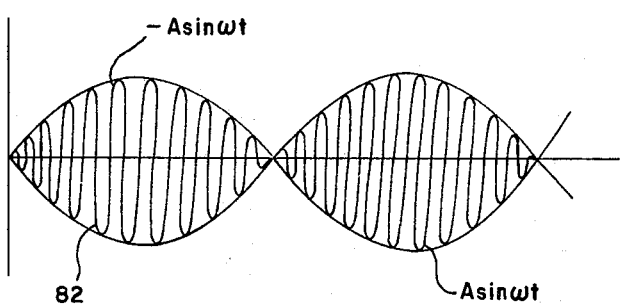
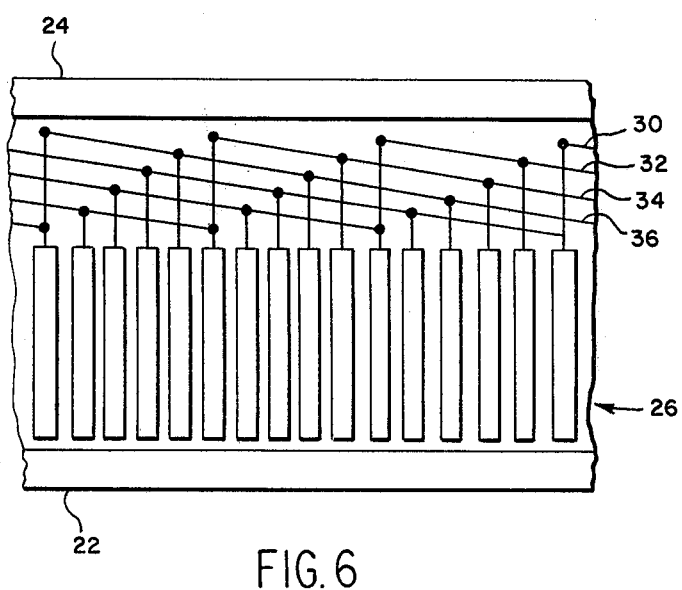
FIG. 6

CAPACITIVE TRANSDUCER WITH CONTINUOUS SINUSOIDAL OUTPUT

BACKGROUND OF THE INVENTION

1. Field of the Invention

This invention relates to linear and rotary capacitive transducers which provide a position related output signal as a result of capacitive coupling between different parts of the transducer. More particularly, the present invention relates to a capacitive transducer which provides extremely accurate sine and cosine output signals.

2. Description of the Prior Art

Various prior art patents utilize capacitive coupling to provide an indication of position. Devices of this type are shown in the following U.S. Pat. Nos.: 3,312,892 to Parnes; 4,092,579 to Weit; 3,068,457 to Nevius; 3,784,897 to Norrie; 3,938,113 to Dobson et al; 3,702,467 to Melnyk; 3,219,920 to Wall; 3,860,918 to Cencel; and 3,961,318 to Farrand et al. Several of the devices described in these patents provide sinusoidal output signals. The devices described in these patents have various disadvantages associated with them, including low output signals, large stray capacitances, high harmonic distortion and complex mechanical construction.

SUMMARY OF THE INVENTION

It is a primary object of the present invention to provide a capacitive position encoder which is simple in construction yet provides highly accurate sine and cosine output signals. It is another object of the present invention to provide a capacitive encoder in which precise mechanical tolerances need not be maintained to achieve proper operation. Yet another object of the invention is the provision of a capacitive encoder which is insensitive to stray electrostatic or electromagnetic fields. Yet another object of the invention is to provide a continuous indication of position whether or not the device which is being measured is stopped or moving at high velocity.

These and other objects are achieved by employing a capacitive encoder which includes a stationary plate and a moving plate, both of which are covered with a conductive material. The moving plate includes a sine wave shaped gap which serves to define a pair of conductive surfaces, with each surface being electrically isolated from the other and from any DC voltages. The sine wave shaped gap covers a significant portion of the moving plate (i.e., it has a large excursion) in order to provide a high amplitude output signal.

The stationary plate includes a pair of transmitter parts as well as a number of receiver bars. The conductive surface on each side of the sine wave capacitively couples to its corresponding transmitter part on the stationary plate. The receiver bars are located between the transmitter parts and overlie the sine wave. The receiver bars are oriented perpendicularly to the direction of motion of the moving plate. In the preferred embodiment, there are four receiver bars for each cycle of the sine wave. Each receiver bar is positioned in one of four phases of the sine wave. High frequency complementary AC input signals are connected to the transmitter parts. The receiver bars provide output signals which vary in amplitude as a function of the position of the sine wave shaped gap with respect to each bar. The output signals from the receiver bars are differentially amplified and synchronously demodulated to provide two final sine and cosine outputs.

BRIEF DESCRIPTION OF THE DRAWINGS

A detailed description of the invention will be made with reference to the accompanying drawings wherein:

FIGS. 3 and 4 are graphs showing output signals provided by the device of FIG. 1;

FIG. 6 is a diagrammatic view showing an improved interconnection arrangement for the encoder of the present invention;

DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
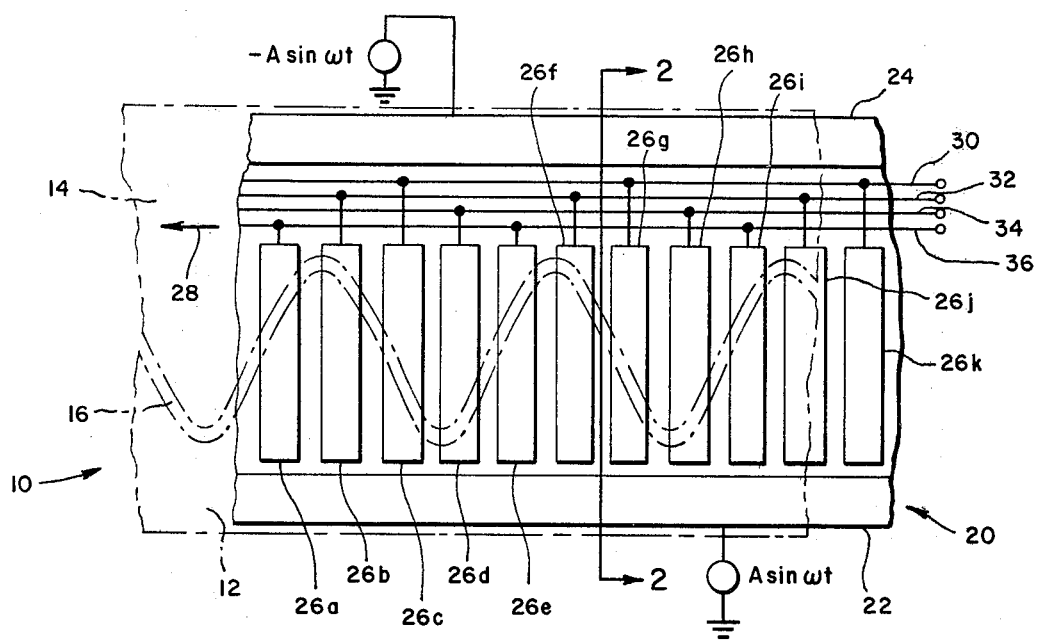
FIG. 1 is a schematic view of a linear encoder according to the present invention.
Figure 2:
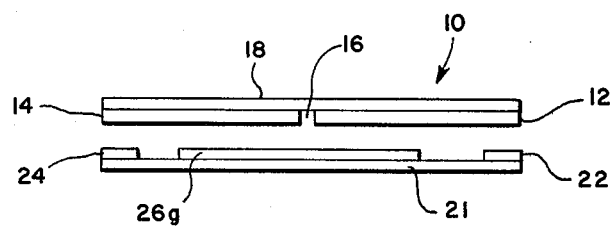
FIG. 2 is a sectional view of the encoder taken along line 2—2 of FIG. 1.

Referring to FIGS. 1 and 2, a portion of a linear capacitive encoder according to the present invention is shown. The encoder includes a moving plate 10 having conductive areas 12 and 14 separated by a sine wave shaped gap 16. As shown in FIG. 2, the conductive areas 12 and 14 are located on a non-conductive plate element 18. The conductive areas are preferably formed of copper, and the gap 16 may be formed extremely accurately by employing conventional etching techniques.

A fixed plate 20 is disposed adjacent and substantially parallel to the moving plate 10. The fixed plate 20 includes a non-conductive substrate 21 upon which is located a pair of conductive transmitter elements 22 and 24. The transmitter elements 22 and 24 overlie the conductive portions 12 and 14 of the moving plate, respectively. Drive signals A sin ωT and −A sin ωT are connected to the transmitter elements 22 and 24, respectively. In the present embodiment of the invention, these drive signals have a frequency on the order of 5 megahertz.

A plurality of conductive receiver bars 26a–26k are located on the fixed plate 21 between the transmitter elements 22 and 24. The receiver bars 26 overlie the sine wave shaped gap 16 and are spaced so that their centers are one-quarter wavelength apart. The direction of movement of the moving plate 10 is indicated by an arrow 28, and the receiver bars are oriented perpendicular to this direction. The receiver bars are connected to output leads 30–36, with the output of every fourth bar being tied together (e.g., the outputs of the bars 26a, 26e and 26i are all connected to the lead 36).

In operation, the out of phase AC inputs to the transmitter elements 22 and 24 are capacitively coupled to the conductive areas 12 and 14 of the moving plate 10. The areas of the transmitter elements 22 and 24 are equal in order to insure that the capacitance between them and the areas 12 and 14, respectively, will be equal. The receiver bars 26 will capacitively couple with both of the conductive areas 12 and 14, with the degree of contribution from each of the conductive areas being determined by the position of the sine wave shaped gap 16 with respect to any particular receiver bar. For example, most of the receiver bar 26b overlaps the area 12, with only a small portion overlapping the area 14. Because of this, the greatest contribution to the final ouput signal the receiver bar 26b will be from the signal A sin ωT, with only a small portion being contributed by the signal −A sin ωT. In contrast, most of the output signal for the receiver bar 26d will be contributed by the −A sin ωT signal, since most of the bar 26d overlaps the area 14. When a receiver bar overlaps the areas 12 and 14 equally, a null output should appear, since the A sin ωT and −A sin ωT signals will contribute equally and will cancel each other out due to their opposing phases.

The output signals developed at the receiver bars are shown in FIGS. 3 and 4. These output signals are in the form of a carrier sine waves 80 and 82 which are amplitude modulated as a function of the sine wave shaped gap 16. When the majority of the area of any particular receiver bar overlaps the area 12, the major contribution will be from the A sin ωT signal and the output will be as shown in the left portion of FIG. 3. As the moving plate moves so that the majority of the receiver bar overlies the area 14, the major contribution to the output signal will be from the −A sin ωT input, and the output will be as shown on the right portion of FIG. 3. The output of a receiver bar which is spaced two bars (i.e., one-half of the sine wave gap period) away will have an ouput which is 180 degrees out of phase, as shown in FIG. 4. For example, if the curve of FIG. 3 represents the output of the receiver bar 26a, the curve of FIG. 4 represents the output of the receiver bar 26c.

Figure 5:
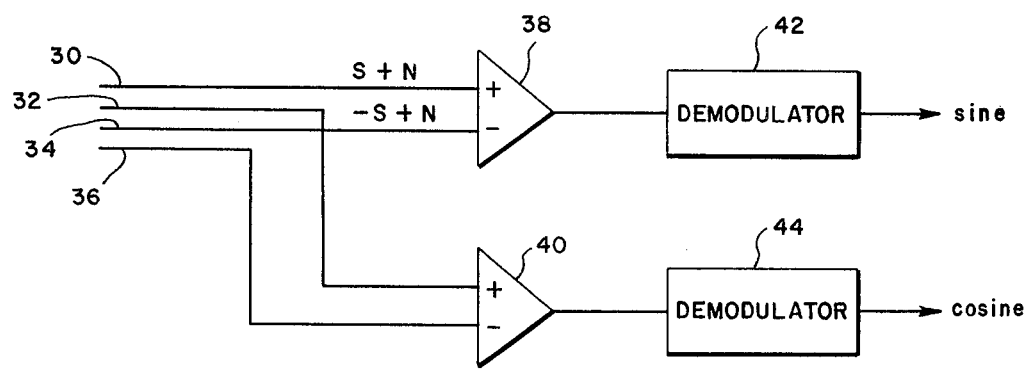
FIG. 5 is a block diagram showing circuitry for providing final sine and cosine encoder outputs.

Referring now to FIG. 5, the outputs 30 and 34 from the receiver bars are connected as inputs to a differential amplifier 38, and the outputs 32 and 36 are connected as inputs to a differential amplifier 40. In this manner, the out of phase signals as shown in FIGS. 3 and 4 are differentially amplified. Because of stray electrostatic and electromagnetic fields, the signals at the outputs of the receiver bars will all include a noise component. For example, the output of the receiver bar 26a will be equal to a signal S plus noise N. Because the receiver bar 26c is out of phase with respect to the bar 26a, its output signal at the same time will be −S+N. By combining the output signals in the differential amplifiers 38 and 40, the amplitude of the information signals will be doubled and the noise will be eiliminated (S+N−(−S+N)=2S). The output signals of the differential amplifiers 38 and 40 are demodulated by means of demodulators 42 and 44 in order to remove the 5 megahertz carrier signals. The demodulators 42 and 44 are conventional devices and provide the final sine and cosine outputs of the encoder.

Thus, the encoder provides sine and cosine outputs which are a function of the position of the sine wave shaped gap with respect to the receiver bars 26. The accuracy of the outputs is largely dependent upon the accuracy of the shape of the gap 16. Etching techniques enable this gap to be shaped with extremely high accuracy, thus enabling very high resolution sine and cosine outputs to be produced. By employing a number of receiver bars, each separated by one period, sporadic errors in the shapes of the receiver bars and the sine wave will be reduced because of averaging of the outputs. That is, although a single group of four receiver bars 26a–26d could be utilized, the accuracy of the outputs is increased by employing the additional sets of receiver bars 26e–26k.

To maximize coupling efficiency, the transmitter elements 22 and 24 should be made equal to each other in area. In addition, in order to provide equal coupling between the surfaces 12 and 14 and the receiver bars, the areas of the surfaces 12 and 14 should be made equal.

The output connections from the receiver bars may be made in a staggered and slanted arrangement as shown in FIG. 6 in order to equalize capacitive coupling between the output lines and the adjacent transmitter element 24. This further increases the accuracy of the final outputs.

Figure 7:
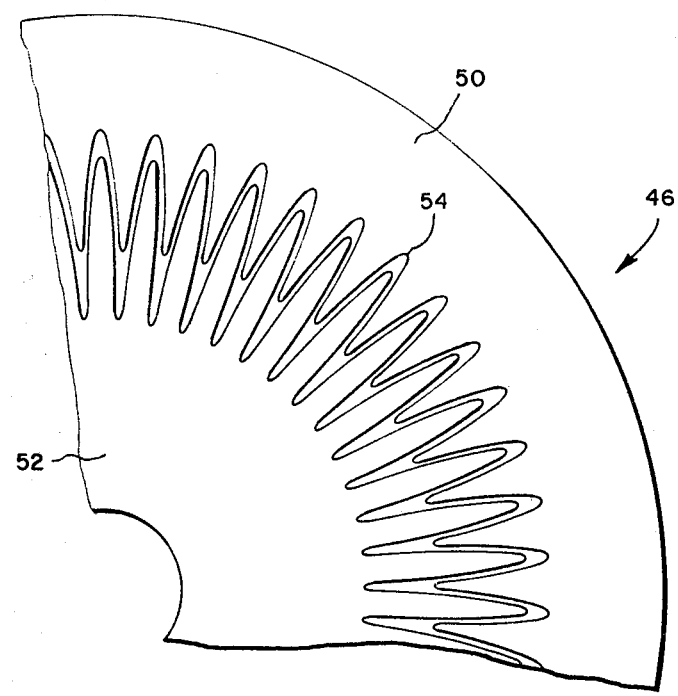
FIG. 7 is a plan view of the movable disc used in a rotary encoder.
Figure 8:
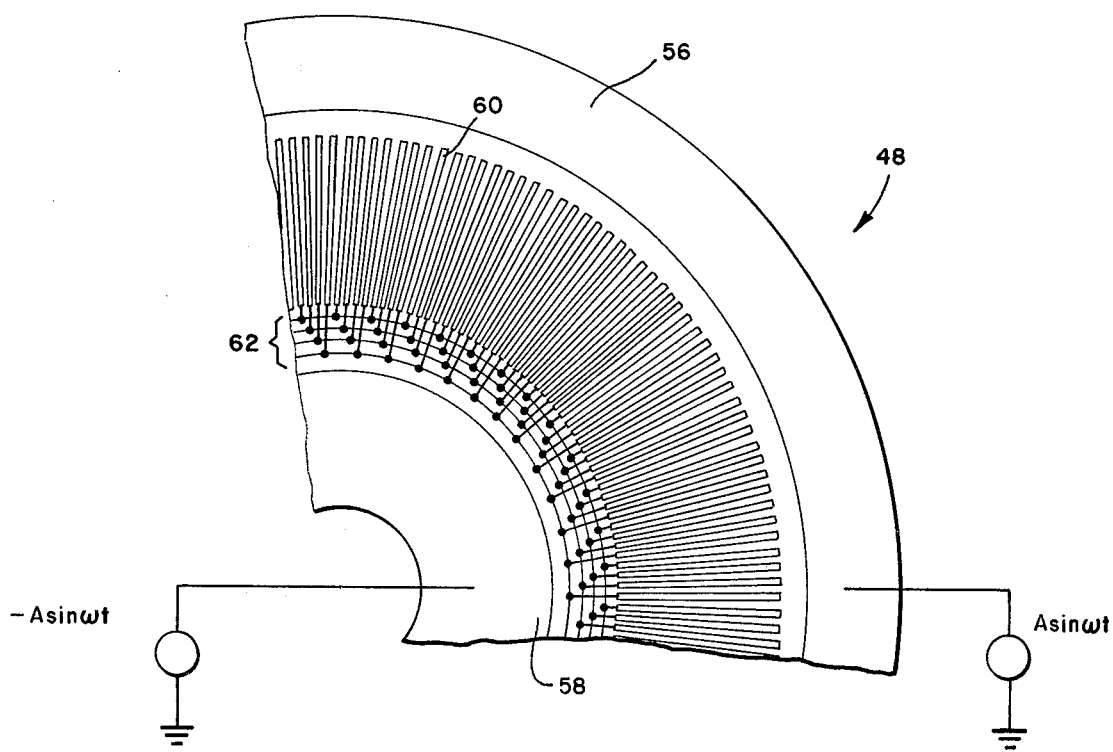
FIG. 8 is a plan view of the stationary disc used in a rotary encoder.

FIGS. 7 and 8 show moving and stationary discs 46 and 48, respectively, which are used to form a rotary capacitive encoder according to the present invention. In a rotary encoder, the moving disc 46 is rotatably and concentrically mounted with respect to the stationary disc and is spaced a small distance therefrom. The basic operation of the rotary encoder is essentially identical to that of the linear encoder described above. The moving disc 46 includes conductive areas 50 and 52 which are separated by an etched gap 54. The stationary disc 48 includes transmitter elements 56 and 58 and receiver bars 60 which are connected to outputs 62. It should be noted that the gap 54 does not correspond in shape to an actual sine wave, but rather is distorted to be the square root of the sine function plus a constant, so that the area covered by a receiver bar over either conductive surface 50 and 52 varies according to the sine function. The outputs of the rotary encoder are voltages which are proportional to the sine and cosine of a multiple of the angle of the disc 46 with respect to the disc 48, which multiple is by the number of cycles of sine wave on the disc 46. The provision of a plurality of groups of receiver bars insures that the output will be accurate despite any relative tilt between the discs, since capacitance variation on one side of the discs will be offset by variation in the direction diametrically opposed.

With many prior art encoders, variations in the input signal results in errors in the output. In the present invention, it is the accuracy of the sine wave shaped gap which determines the accuracy of the final sine and cosine outputs. Variations in input signal amplitude will affect the output amplitude but will not distort the sine and cosine waves.

In summary, the present invention provides a capacitive encoder having a moving plate with conductive areas separated by a sine wave shaped gap. The encoder has complementary inputs and complementary outputs located on a stationary plate which couples with the conductive areas on the moving plate. The sine wave gap takes up a major portion of the width of the moving plate in order to provide maximum output signal. The outputs of the stationary plate are differentially amplified and demodulated in order to provide final sine and cosine outputs. By providing a plurality of output elements, the output signal amplitude is increased and errors due to mechanical misalignment (tilting or off center mounting) and inaccuracies in the shapes of the output elements or sine wave gap are reduced. The invention thus provides a low cost capacitive encoder which has extremely accurate sine and cosine outputs.

I claim:

1. A rotary capacitive transducer, comprising:

a stationary disc including a first conductive annular input area near the center of the disc, a second conductive annular input area near the edge of the disc and first and second conductive output areas extending radially between the input areas;

a movable disc which is adjacent to, concentric with and rotatable with respect to the stationary disc, said movable disc including first and second conductive annular coupling areas, wherein the first coupling area overlaps the first input area and extends radially outward so as to overlap the output areas, the second coupling area overlaps the second input area and extends radially inward so as to overlap the output areas, wherein the coupling areas are separated by an annular gap which is shaped so that the area of overlap between each coupling area and each output area various sinusoidally as the movable disc rotates, and wherein the output areas are spaced apart a distance corresponding to one half period of the gap;

input means for providing first and second complementary input carrier signals to the first and second input areas, respectively, whereby the input signals will be capacitively coupled to the output areas to provide first and second output signals;

differential means for differentially combining the first and second output signals; and demodulator means for demodulating the output of the differential means to thereby provide a sinusoidal transducer output.

2. A linear capacitive transducer, comprising:

a stationary plate including a first conductive linear input area, a second conductive linear input area parallel to the first input area and first and second conductive output areas extending between the input areas perpendicularly thereto;

a movable plate which faces and is movable with respect to the stationary plate in a direction perpendicular to the output areas, said movable plate including first and second conductive coupling areas, wherein the first coupling area overlaps the first input area and the output areas, the second coupling area overlaps the second input area and the output areas, wherein the coupling areas are separated by a sine wave shaped gap which runs parallel to the input areas, whereby the area of overlap between each coupling area and each output area varies sinusoidally as the plate moves, and wherein the output areas are spaced apart a distance corresponding to one half period of the gap;

input means for providing first and second complementary input carrier signals to the first and second input areas, respectively, whereby the input signals will be capacitively coupled to the output areas to provide first and second output signals;

differential means for differentially combining the first and second output signals; and demodulator means for demodulating the output of the differential means to thereby provide a sinusoidal transducer output.

3. A transducer according to claims 1 or 2 including a plurality of first output areas spaced one period from each other and a plurality of second output areas spaced one period from each other, wherein the first output areas are connected together and the second output areas are connected together.

4. A transducer according to claims 1 or 2 further including:

third and fourth output areas interleaved with the first and second output areas, wherein the third and fourth output areas are spaced one half period from each other and one quarter period from the first and second outputs, respectively, wherein the input signals will be capacitively coupled to the third and fourth output areas to provide third and fourth output signals, wherein the differential means differentially combines the third and fouth output signals, whereby the demodulator means provides sine and cosine transducer outputs.

5. A transducer according to claims 1 or 2 wherein the input areas are equal in area and wherein the total area of the input areas is equal to the total area of the output areas.

6. A transducer according to claims 1 or 2 wherein the gap is etched.

7. A transducer according to claims 1 or 2 wherein the input signals are sinusoidal.

8. A transducer according to claims 1 or 2 wherein the output areas are rectangular and are oriented so that their major axis is substantially perpendicular to the direction of movement of the gap.

9. A rotary capacitive transducer, comprising:

a stationary disc including an inner conductive annular input area near the center of the disc, an outer conductive annular input area near the edge of the disc and first, second, third and fourth interleaved groups of conductive output areas extending radially between the input areas;

a movable disc which is concentric with and rotatable with respect to the stationary disc, said movable disc including inner and outer conductive coupling areas, wherein the inner coupling area overlaps a portion of the inner input area and the outer coupling area overlaps a portion of the outer input area, wherein the inner and outer coupling areas both overlap all of the output areas, wherein the coupling areas are separated by an annular gap which is shaped so that the amount of overlap between each coupling area and each output area varies sinusoidally as the movable disc rotates, and wherein each output areas is spaced from other output areas in its group by a distance corresponding to one period of the gap, wherein output areas of the first and third groups are spaced from output areas of the second and fourth groups by a distance corresponding to one half period of the gap, respectively, and wherein adjacent output areas are spaced apart a distance corresponding to one quarter period of the gap;

input means for providing first and second complementary AC input signals to the outer and inner input areas, respectively, whereby the input signals will be capacitively coupled to the output areas to provide first, second, third and fourth modulated output signals, respectively;

differential means for differentially combining the first and second output signals and differentially combining the third and fourth output signals;

demodulator means for demodulating the output of the differential means to provide first and second complementary sinusoidal position signals.

10. A linear capacitive transducer, comprising:

a stationary plate including a first conductive input strip, a second conductive input strip parallel to the first strip and first, second, third and fourth interleaved groups of conductive output strips extending between the input strips perpendicular thereto;

a movable plate which is movable with respect to the stationary plate, said movable plate including first and second conductive coupling areas, wherein the first coupling area overlaps a portion of the first input strip and the second coupling area overlaps a portion of the second input strip, wherein the first and second coupling areas both overlap all of the output areas, wherein the coupling areas are separated by a gap which extends in a direction parallel to the input strips and is shaped so that the amount of overlap between each coupling area and each output area varies sinusoidally as the movable plate moves, and wherein each output area is spaced from other output areas in its group by a distance corresponding to one period of the gap, wherein output areas of the second and fourth groups are spaced from output areas of the second and fourth groups by a distance corresponding to one half period of the gap, respectively, and wherein adjacent output areas are spaced apart a distance corresponding to one quarter period of the gap;

input means for providing first and second complementary AC input signals to the first and second input strips, respectively, whereby the input signals will be capacitively coupled to the output areas to provide first, second, third and fourth modulated output signals from the first, second, third and fourth output areas, respectively;

differential means for differentially combining the first and second output signals and differentially combining the third and fourth output signals;

demodulator means for demodulating the output of the differential means to provide first and second complementary sinusoidal position signals.

* * * * *